(12) United States Patent
Guo et al.

(10) Patent No.: US 11,229,883 B2
(45) Date of Patent: Jan. 25, 2022

(54) FILTRATION SYSTEM

(71) Applicant: PPG Industries Ohio, Inc., Cleveland, OH (US)

(72) Inventors: Qunhui Guo, Murrysville, PA (US);
James C. Peters, Pittsburgh, PA (US);
Scott P. Yaeger, La Porte, IN (US)

(73) Assignee: PPG Industries Ohio, Inc., Cleveland, OH (US)

( * ) Notice: Subject to any disclaimer, the term of this patent is extended or adjusted under 35 U.S.C. 154(b) by 595 days.

(21) Appl. No.: 15/786,176

(22) Filed: Oct. 17, 2017

(65) Prior Publication Data
US 2018/0104651 A1   Apr. 19, 2018

Related U.S. Application Data

(60) Provisional application No. 62/410,075, filed on Oct. 19, 2016.

(51) Int. Cl.
| | | |
|---|---|---|
| *B01D 63/12* | (2006.01) | |
| *B01D 65/08* | (2006.01) | |
| *B01D 69/04* | (2006.01) | |
| *B01D 61/14* | (2006.01) | |

(52) U.S. Cl.
CPC ........... *B01D 63/12* (2013.01); *B01D 61/142* (2013.01); *B01D 65/08* (2013.01); *B01D 69/04* (2013.01); *B01D 2257/702* (2013.01); *B01D 2313/143* (2013.01); *B01D 2317/022* (2013.01); *B01D 2317/025* (2013.01); *B01D 2317/027* (2013.01)

(58) Field of Classification Search
CPC ........ B01D 63/12; B01D 65/08; B01D 69/04; B01D 61/142; B01D 2317/022; B01D 2317/025; B01D 2317/027; B01D 2313/143; B01D 2257/702
See application file for complete search history.

(56) References Cited

U.S. PATENT DOCUMENTS

| | | | |
|---|---|---|---|
| 2013/0146540 A1* | 6/2013 | Dontula | B01D 63/10 210/652 |
| 2018/0036684 A1* | 2/2018 | Jons | B01D 61/025 |

\* cited by examiner

*Primary Examiner* — John Kim
(74) *Attorney, Agent, or Firm* — Nina A. Reger

(57) ABSTRACT

A filtration system includes at least one spiral wound first filter section in fluid communication with at least one spiral wound second filter section. The first and second filter sections include: (i) a filtration membrane; (ii) a feed spacer located adjacent the filtration membrane and defining a feed flow channel; and (iii) a permeate spacer located adjacent the filtration membrane and defining a permeate flow channel. A thickness of the feed flow channel in the first filter section is different than a thickness of the feed flow channel in the second filter section, and/or an effective volume of the first filter section is different than an effective volume of the second filter section. A method of filtering a feed flow is also disclosed.

20 Claims, 8 Drawing Sheets

FILTRATION SYSTEM

CROSS-REFERENCE TO RELATED APPLICATIONS

This application claims priority to United States Provisional Patent Application Ser. No. 62/410,075, filed on Oct. 19, 2016, which is hereby incorporated by reference in its entirety.

BACKGROUND OF THE INVENTION

Field of the Invention

The invention relates to a filtration system for filtering a feed flow and a method of filtering the feed flow.

Description of Related Art

The removal of contaminants from wastewater typically involves the use of multiple filtration steps through a series of filter cartridges. With improvements being made in filtration membrane efficiencies (flux), standard filter systems may experience significantly reduced volumes of wastewater delivered to downstream filter cartridges in the filtration system. This results in the reduction of flow velocity and pressure as the fluid moves downstream in the filtration system. The reduction of velocity and pressure increases the propensity for contaminants to foul the surfaces of the membranes within the filter cartridges. Fouling causes the feed flow and pressure distribution inside the cartridge to be unevenly distributed, decreasing the membrane utilization rate.

Therefore, there is a need for a filtration system that accounts for the increased efficiencies in filtration membranes, such that the filtration system prevents fouling on the membranes.

SUMMARY OF THE INVENTION

A filtration system includes at least one spiral wound first filter section in fluid communication with at least one spiral wound second filter section. The first and second filter sections include: (1) a filtration membrane; (2) a feed spacer located adjacent the filtration membrane and defining a feed flow channel; and (3) a permeate spacer located adjacent the filtration membrane and defining a permeate flow channel. A thickness of the feed flow channel in the first filter section is different than a thickness of the feed flow channel in the second filter section, and/or an effective volume of the first filter section is different than an effective volume of the second filter section.

A velocity of feed through the first filter section and the second filter section may be substantially constant. The first and second filter sections may be located in a single filter cartridge. The first and second filter sections may be arranged in series. The first filter section may be located upstream of the second filter section, and the thickness of the feed flow channel in the second filter section may be smaller than the thickness of the feed flow channel in the first filter section. The first filter section may be located upstream of the second filter section, and the effective volume of the second filter section may be smaller than the effective volume of the first filter section.

A plurality of first filter sections may be arranged in parallel. The feed flow channels of the first filter sections may discharge into a common discharge header. At least one second filter section may be in fluid communication with the common discharge header. The number of first filter sections may be greater than the number of second filter sections. An effective volume of the at least one second filter section may be smaller than a sum of the effective volumes of the plurality of first filter sections.

The first filter section and/or the second filter section may include a plurality of laminar units. Each laminar unit may include a feed spacer, a first filtration membrane adjacent the feed spacer, a permeate spacer adjacent the first filtration membrane, and a second filtration membrane adjacent the permeate spacer. A velocity of feed through the second filter section may be 95-125% of a velocity of feed through the first filter section. The first filter section and the second filter section may each include at least one laminar unit, and the number of laminar units of the first filter section may be different from the number of laminar units of the second filter section.

A method of filtering a feed flow includes: introducing a feed flow into at least one spiral wound first filter section including a filtration membrane, a feed spacer located adjacent the filtration membrane and defining a feed flow channel, and a permeate spacer located adjacent the filtration membrane and defining a permeate flow channel; removing permeate via the permeate flow channel of the first filter section to form a concentrated feed flow; and discharging the concentrated feed flow from the first filter section to a spiral wound second filter section. The second filter section includes a filtration membrane, a feed spacer located adjacent the filtration membrane and defining a feed flow channel, and a permeate spacer located adjacent the filtration membrane and defining a permeate flow channel. A thickness of the feed flow channel in the first filter section is different than a thickness of the feed flow channel in the second filter section such that a velocity of feed flow through the filtration system is substantially constant.

The first and second filter sections may be located in a single filter cartridge. The first and second filter sections may be arranged in series. The first filter section may be located upstream of the second filter section. The thickness of the feed flow channel in the second filter section may be smaller than the thickness of the feed flow channel in the first filter section. The first filter section may be located upstream of the second filter section. The effective volume of the second filter section may be smaller than the effective volume of the first filter section.

A plurality of first filter sections may be arranged in parallel. The feed flow channels of the first filter sections may discharge into a common discharge header. At least one second filter section may be in fluid communication with the common discharge header. The number of first filter sections may be greater than the number of second filter sections. An effective volume of the at least one second filter section may be smaller than a sum of the effective volumes of the plurality of first filter sections.

The first filter section and/or the second filter section may include a plurality of laminar units. Each laminar unit may include a feed spacer, a first filtration membrane adjacent the feed spacer, a permeate spacer adjacent the first filtration membrane, and a second filtration membrane adjacent the permeate spacer. The feed may include a hydrocarbon.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

DESCRIPTION OF THE INVENTION

Figure 1:
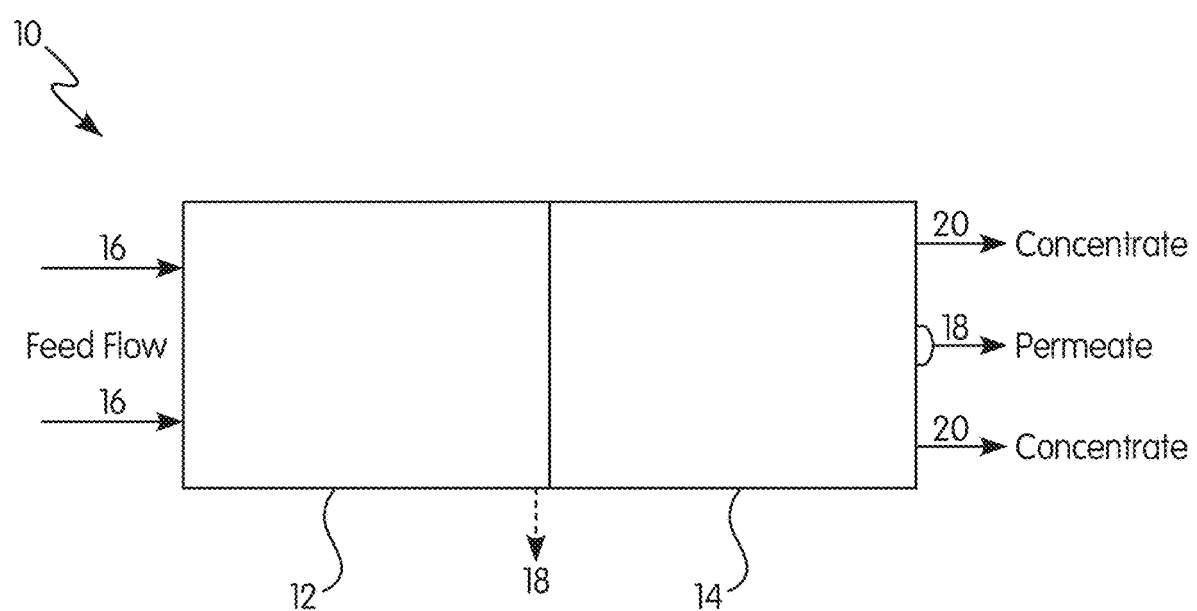
FIG. 1 shows a schematic diagram of a filtration system according to the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not considered as limiting.

As used in the specification and the claims, the singular form of "a", "an", and "the" include plural referents unless the context clearly dictates otherwise.

All numbers used in the specification and claims are to be understood as being modified in all instances by the term "about". By "about" is meant a range of plus or minus ten percent of the stated value.

The term "such as" is to be understood as being non-limiting. That is, the elements recited after "such as" are to be understood as being non-limiting examples of the recited features.

All ranges disclosed herein encompass the beginning and ending range values and any and all subranges subsumed therein. The ranges disclosed herein represent the average values over the specified range.

All documents referred to herein are "incorporated by reference" in their entirety.

By "at least" is meant "greater than or equal to". By "not greater than" is meant "less than or equal to".

The term "includes" is synonymous with "comprises".

When referring to different conditions, the terms "first", "second", etc., are not intended to refer to any particular order or chronology but instead refer to different positions, conditions, or properties.

Referring to FIG. 1, a filtration system 10 includes a plurality of spiral wound filter sections 12, 14, such as a spiral wound first filter section 12 and a spiral wound second filter section 14. It is to be understood that the filtration system 10 may include more than two filter sections 12, 14 ($n^{th}$ filter sections 15 not shown in FIG. 1). The first filter section 12 is in fluid communication with the second filter section 14. There may be multiple first filter sections 12 and/or second filter sections 14 in the filtration system 10.

A feed flow, such as a feed solution 16, may be flowed into the first filter section 12 of the filtration system 10 and may exit the filtration system 10 out of the second filter section 14 as a permeate product 18 and a concentrate product 20. The permeate product 18 may also be pulled off proximate the outlet end of the first filter section 12. The concentrate product 20 of the first filter section 12 flows into the second filter section 14. The feed solution 16 may be any gas or liquid capable of undergoing filtration. For instance, the filtration system 10 may be used to separate the feed solution 16 of wastewater containing contaminants. The contaminants may include oil and other hydrocarbons (e.g., an oil-water separation). However, the filtration system 10 is not limited to use for oil-water separation, and may be used in a broad range of filtering applications, such as for filtering paints, particle filtration, industrial water filtration, gray water filtration, dairy filtration, juice filtration, and the like. The permeate product 18 exiting the filtration system 10 may include at least a portion of the feed solution 16 capable of passing through pores of a filtration membranes 22 (not shown in FIG. 1) in the first and second filter sections 12, 14. The concentrate product 20 exiting the filtration system 10 may include at least a portion of the feed solution 16 having a particle size larger than the pore size of the filtration membranes 22 and not capable of passing through the filtration membranes 22. In the example of the oil-water separation above, the permeate product 18 may include at least some of the water from the feed solution 16, which is capable of passing through the filtration membranes 22. The concentrate product 20 may include at least some of the oil or other hydrocarbon particles from the feed solution 16 too large to pass through the pores of the filtration membranes 22. Thus, in this example, the permeate product 18 may be clean water product (e.g., having fewer contaminants than the feed solution 16), and the concentrate product 20 may be an oil-rich product (e.g., having a higher oil/hydrocarbon concentration than the feed solution 16).

The feed solution 16 may be separated into permeate product 18 and concentrate product 20 using a reverse osmosis process, ultrafiltration, or microfiltration. The membranes to effect this separation may be any of those membrane materials listed herein. This separation can also be accomplished by use of hydrophilic or hydrophobic membranes, or ionic separation using charged membranes. In the case of oil-water separation, the oil may not be particulate, but it may instead be in the form of an emulsion or a phase-separated system. In this case, the use of a hydrophilic and/or an oleophobic membrane may be used.

Figure 2:
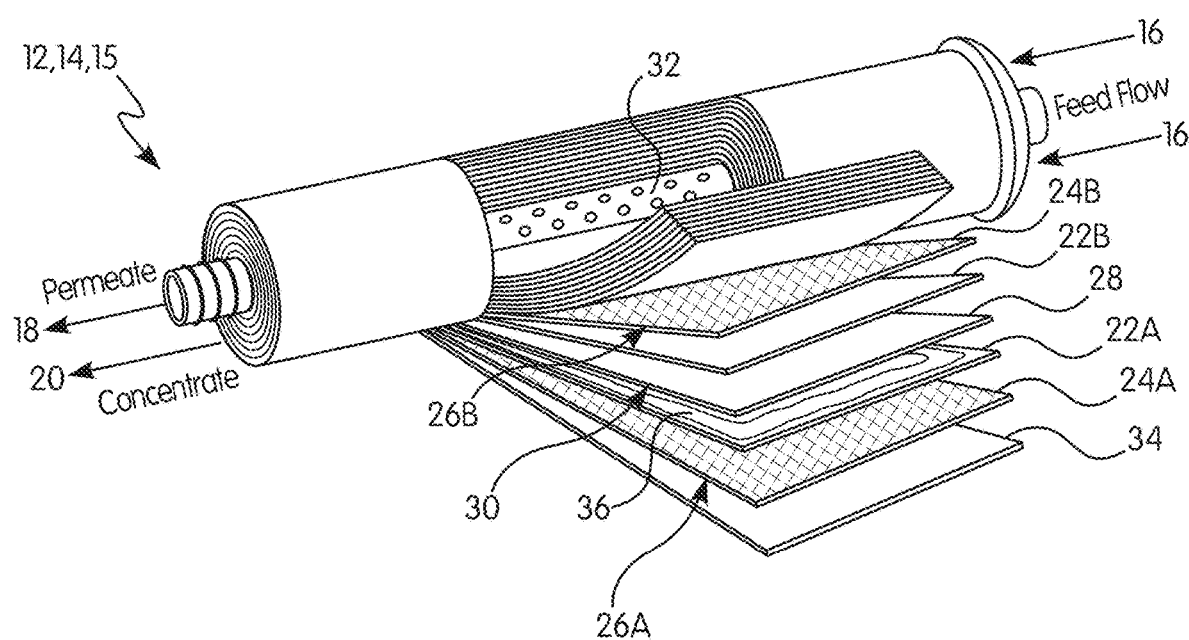
FIG. 2 shows a perspective view of a filter section of a filtration system, a section of the filter section cut-away to show various layers of the filter section.

Referring to FIG. 2, a view of the filter sections 12, 14, 15, such as the first filter section 12, the second filter section 14, and the $n^{th}$ filter section 15, having a portion cut away to see the layers of the filter sections 12, 14, 15 is shown. Each filter section 12, 14, 15 may include the following layers: at least one filtration membrane 22A, 22B, at least one feed spacer 24A, 24B, at least one feed flow channel 26A, 26B, at least one permeate spacer 28, and at least one permeate flow channel 30. The feed spacer 24A, 24B may be located adjacent to the filtration membrane 22A, 22B. The feed spacer 24A, 24B may define the feed flow channel 26A, 26B, which allows feed solution 16 (and concentrate product 20 downstream) to flow therethrough. The permeate spacer 28 may be located adjacent to the filtration membrane 22A, 22B. The permeate spacer 28 may define the permeate flow channel 30, which allows the permeate product 18 to flow therethrough. A permeate tube 32 may be disposed inside the innermost layer of the filter sections 12, 14, 15 to flow permeate product 18 from the filtration system 10. Outside the outermost layer of the filter section 12, 14, 15 may be an outer wrap 34 to enclose the layers of the filter section 12, 14, 15. In FIG. 2, the outer wrap 34 is adjacent the outermost feed spacer 24A. Adjacent layers of the filter sections 12, 14, 15 may be attached together by any means, such as attached using a glue 36.

The filtration membrane 22A, 22B may be a porous material configured to allow a portion of the feed solution 16 to pass therethrough. The filtration membrane 22A, 22B may be designed to include pores of any size appropriate for a specific filtering application. The size of the pores of the filtration membrane 22A, 22B may range from 0.01 microns to 0.4 microns. The filtration membrane 22A, 22B may be a microfiltration membrane or an ultrafiltration membrane. The filtration membrane 22A, 22B may allow for the filtration system 10 to operate at a high flux rate. For a feed solution 16 that is an oil-water mix, the filtration membrane 22A, 22B may allow the filtration system 10 to operate at a flux rate of 15-25 GFD (gal/ft$^2$ membrane area/day). For a feed solution 16 that is pure water, the filtration membrane 22A, 22B may allow the filtration system 10 to operate at a flux rate of 50-80 GFD.

The filtration membrane 22A, 22B may be made of polymeric material. Polymeric material that may be used for the filtration membrane 22A, 22B may include cellulose acetate, nitrocellulose, and cellulose esters (CA, CN, and CE), polysulfone (PS), polyether sulfone (PES), polyacrylonitrile (PAN), polyamide, polyimide, polyethylene and polypropylene (PE and PP), polytetrafluoroethylene (PTFE), polyvinylidene fluoride (PVDF), polyvinylchloride (PVC), or a combination thereof. The filtration membrane 22A, 22B may be a composite membrane, such as a polymer membrane with inorganic filler therein. Such fillers may include particles of silica, titanium oxide, iron oxide, calcium oxide, copper oxide, zinc oxide, antimony oxide, zirconium oxide, magnesium oxide, alumina, molybdenum disulfide, zinc sulfide, barium sulfate, strontium sulfate, calcium carbonate, magnesium carbonate, magnesium hydroxide, and mixtures thereof. In one example, the finely divided, particulate filler includes an inorganic filler material from the group of silica, alumina, calcium oxide, zinc oxide, magnesium oxide, titanium oxide, zirconium oxide, and mixtures thereof. The composite membrane may be a multi-layer membrane having the composite layer overlay any woven (e.g., PP, PE, polyester, or any blend) materials.

The filtration membrane 22A, 22B may not be the same throughout the entire filtration system 10, and each filter section 12, 14, 15 may include a different filtration membrane 22A, 22B. The filtration membrane 22A, 22B in one filter section 12, 14, 15 may be made of a different material than the filtration membrane 22A, 22B in another filter section 12, 14, 15. Additionally, the average pore size of the filtration membrane 22A, 22B in one filter section 12, 14, 15 may be different than the average pore size of the filtration membrane 22A, 22B in another filter section 12, 14, 15. In one example having a first filter section 12 and a second filter section 14, the average pore size of the filtration membrane 22A, 22B in the first filter section 12 may be larger than the average pore size of the filtration membrane 22A, 22B in the second filter section 14.

Figure 3:
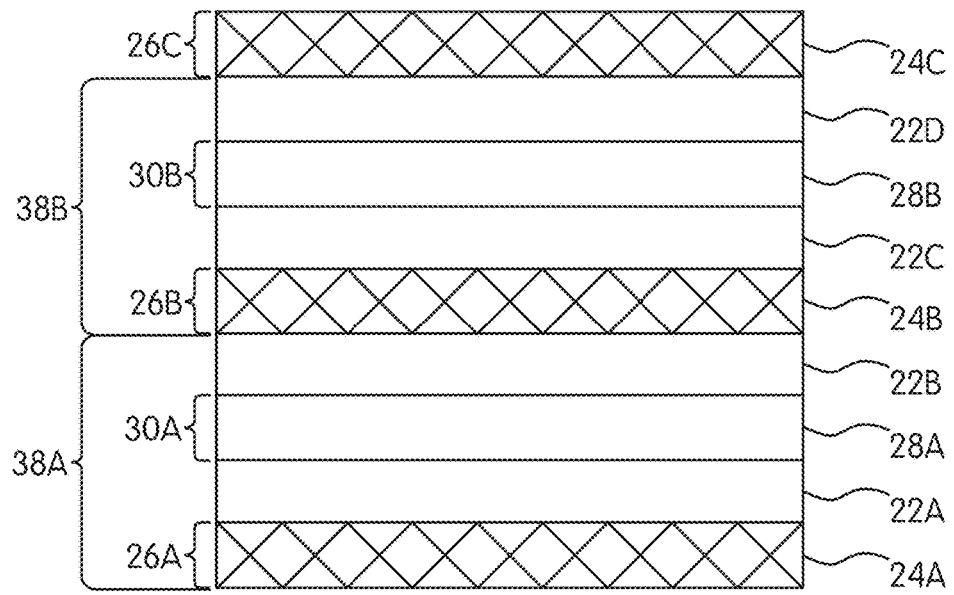
FIG. 3 shows a schematic diagram of various layers of a filter section.

Referring to FIG. 3, the layers of each filter section 12, 14, 15 (not shown) may include a plurality of laminar units 38A, 38B. Each laminar unit 38A, 38B may include a feed spacer 24A, 24B, 24C, two filtration membranes 22A, 22B, 22C, 22D, and a permeate spacer 28A, 28B. Each laminar unit 38A, 38B may also include a feed flow channel 26A, 26B and a permeate flow channel 30A, 30B. The feed flow channel 26A, 26B, 26C is defined by the feed spacer 24A, 24B, 24C, which has a thickness defining the thickness of the feed flow channel 26A, 26B, 26C. The example shown in FIG. 3 includes at least two laminar units 38A, 38B. The first laminar unit 38A has a first feed spacer 24A, a first filtration membrane 22A, a second filtration membrane 22B, and a first permeate spacer 28A. The first filtration membrane 22A is adjacent to the first feed spacer 24A. The first permeate spacer 28A is adjacent the first filtration membrane 22A. The second filtration membrane 22B is adjacent the first permeate spacer 28A. The second laminar unit 38B has a second feed spacer 24B, a third filtration membrane 22C, a fourth filtration membrane 22D, and a second permeate spacer 28B. The third filtration membrane 22C is adjacent to the second feed spacer 24B. The second permeate spacer 28B is adjacent the third filtration membrane 22C. The fourth filtration membrane 22D is adjacent the second permeate spacer 28B. Further, the second filtration membrane 22B of the first laminar unit 38A is adjacent the second feed spacer 24B of the second laminar unit 38B. The first laminar unit 38A may be adjacent the second laminar unit 38. Additional laminar units 38A, 38B may also be included.

The first filter section 12 and the second filter section 14 may each include at least one leaf/laminar unit. The number of leafs in the first filter section 12 may be different than the number of leafs in the second filter section 14.

Figure 4:
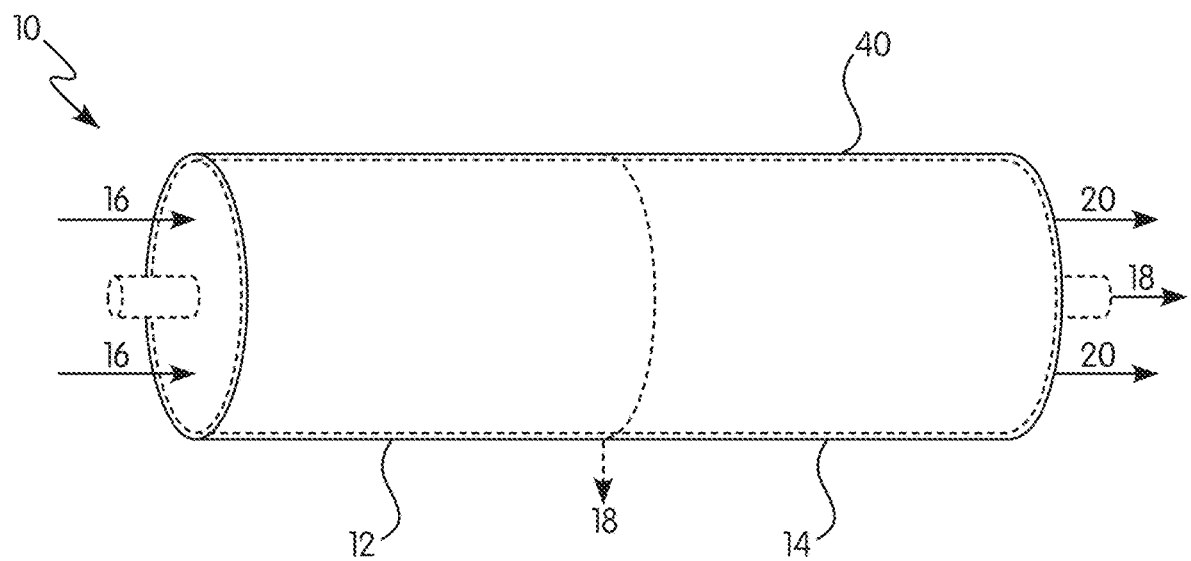
FIG. 4 shows a perspective view of a filtration system having two filter sections housed in a single filter cartridge.

Referring to FIG. 4, the filtration system 10 may include a plurality of filter sections 12, 14 arranged in series in a single filter cartridge 40. The filter cartridge 40 may be an industry standard filter cartridge 40. The first filter section 12 is adjacent to and in fluid communication with the second filter section 14, and the first filter section 12 is arranged in series with the second filter section 14. The feed solution 16 flows into the first filter section 12 of the filtration system 10 and into the second filter section 14. A permeate product 18 and a concentrate product 20 exit the filtration system 10 through the second filter section 14.

Referring to FIGS. 2 and 4, the first and second filter sections 12, 14 of FIG. 4 are configured as the filter section 12, 14, 15 illustrated in FIG. 2 (e.g., the filter cartridge 40 of FIG. 4 houses two filter sections 12, 14, as shown in FIG. 2, arranged end-to-end in series with the first filter section 12 positioned upstream of the second filter section 14). In this example, the feed solution 16 enters the first filter section 12 having a first effective volume and is filtered into a permeate product 18 and a concentrate product 20. The permeate product 18 of the first filter section 12 may be pulled off of the first filter section 12. The concentrate product 20 of the first filter section 12 flows through the feed flow channels 26A, 26B of the first filter section 12, each of the feed flow channels 26A, 26B having a first thickness. The concentrate product 20 of the first filter section 12 then flows into the feed flow channels 26A, 26B of the second filter section 14 having a second effective volume, and the feed flow channels 26A, 26B of the second filter section 14 having a second thickness. The volume of the concentrate product 20 of the first filter section 12 delivered to the second filter section 14 is less than the volume of the feed solution 16 delivered to the first filter section 12. The concentrate product 20 of the first filter section 12 delivered to the second filter section 12 is separated into permeate product 18 and concentrate product 20, both of which exit the filtration system 10.

In this example, the thickness of the feed flow channels 26A, 26B of the first filter section 12 is greater than the thickness of the feed flow channels 26A, 26B of the second filter section 14. The thickness of the feed flow channels 26A, 26B may range from 10-200 mils, such as from 30-100 mils. In addition, the effective volume of the first filter section 12 is greater than the effective volume of the second filter section 14. The effective volume is defined as the effective membrane area multiplied by the thickness of the feed spacer. The effective membrane area is the surface area of the membrane that comes in contact with the fluid. The change in thickness and/or effective volume may be done without changing the physical size of the filter sections 12, 14 so that the filter sections 12, 14 can still fit into filter cartridges 40 of standard industry sizes. The thickness of the feed flow channels 26A, 26B of the second filter section 14 and the effective volume of the second filter section 14 are reduced compared to that of the first filter section 12 by an amount such that the flow velocity of the material in the feed flow channels 26A, 26B of the first filter section 12 and the second filter section 14 is substantially constant. In other words, the flow through the filtration system 10 maintains a substantially constant velocity because the reduced thickness and reduced effective volume downstream accounts for the decreased volume of material flowing through the feed flow channels 26A, 26B of the second filter section 14. Maintaining a substantially constant velocity throughout the filtration system 10 helps to prevent fouling on the surfaces of the filtration membranes 22A, 22B that might otherwise occur based on a drop in velocity of the flow downstream in a filtration system 10 having feed flow channels 26A, 26B having the same thickness throughout and/or having the same effective volume throughout. A substantially constant velocity means that the average flow velocity in one filter section 12, 14 is within 20% of the average flow velocity in another filter section 12, 14, such as within 15%, such as within 10%, or such as within 5%. The average flow velocity of the material through the second filter section 14 may be 95-125% of the average flow velocity of the material through the first filter section 12, such as 95-110%, such as 97-120%, or such as 100-115%. The average flow velocity of the material through the second filter section 14 may be greater than or equal to the average flow velocity of the material through the first filter section 12. The average flow velocity of flow in the filtration system 10 may be selected based on the type of feed solution 16 being filtered. For instance, in an oil-water separation, dirtier water (water having a higher initial oil content) may require a higher average flow velocity through the filtration system 10. However, the average flow velocity may not be so high as to force particles of a larger size through the pores of the filtration membranes 22A, 22B.

A change in effective volume between the filter sections 12, 14 may be accomplished by a variety of means including varying the number of laminar units 38A, 38B, the size of the spacer 24A, 24B, the size of the laminar units 38A, 38B (e.g., the amount of surface area), the length of each filter section 12, 14, or any combination thereof.

Figure 5:
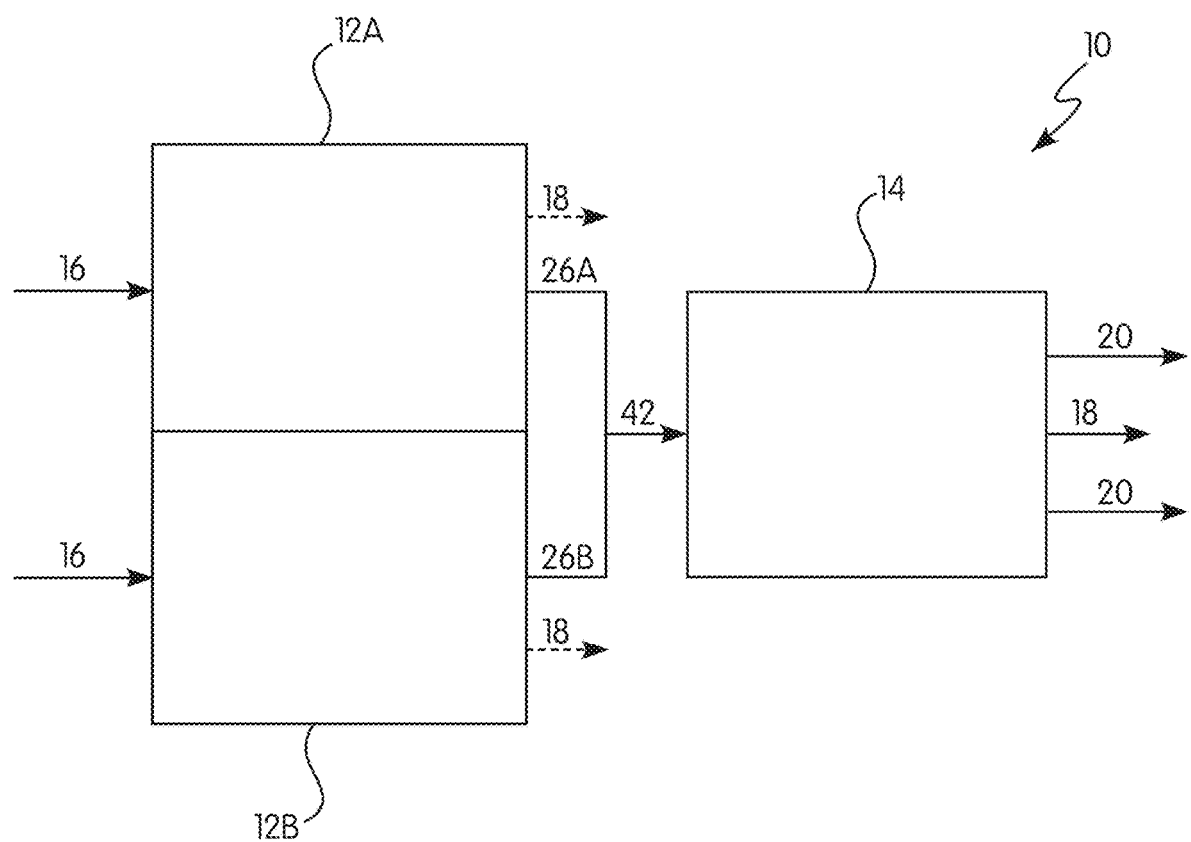
FIG. 5 shows a schematic diagram of a filtration system having two first filter sections arranged in parallel, both of which are arranged in series with a second filter section.

Referring to FIG. 5, the filtration system 10 may include a plurality of filter sections 12A, 12B, 14 with at least two of the filter sections 12A, 12B, 14 arranged in parallel. In the example shown in FIG. 5, two first filter sections 12A, 12B are arranged in parallel with one another and in series with a second filter section 14. The feed solution 16 is flowed through the first filter sections 12A, 12B, and the portion of the feed solution 16 not filtered off in one of the first filter sections 12A, 12B (as the permeate product 18 of the first filter sections 12A, 12B) exits the first filter sections 12A, 12B through the feed flow channels 26A, 26B of the first filter sections 12A, 12B and discharges into a common discharge header 42. This portion of the flow in the common discharge header 42 is then flowed into the second filter section 14 (e.g., the second filter section 14 is in fluid communication with the common discharge header 42), which filters the flow from the common discharge header 42 into the permeate product 18 and the concentrate product 20. The permeate product 18 exiting one of the first filter sections 12A, 12B may be of the same or different concentration as the permeate product 18 exiting the second filter section 14, and the concentrate product 20 exiting the second filter section 14 may be of the same or different concentration compared to the flow exiting the feed flow channels 26A, 26B of the first filter sections 12A, 12B.

Figure 6:
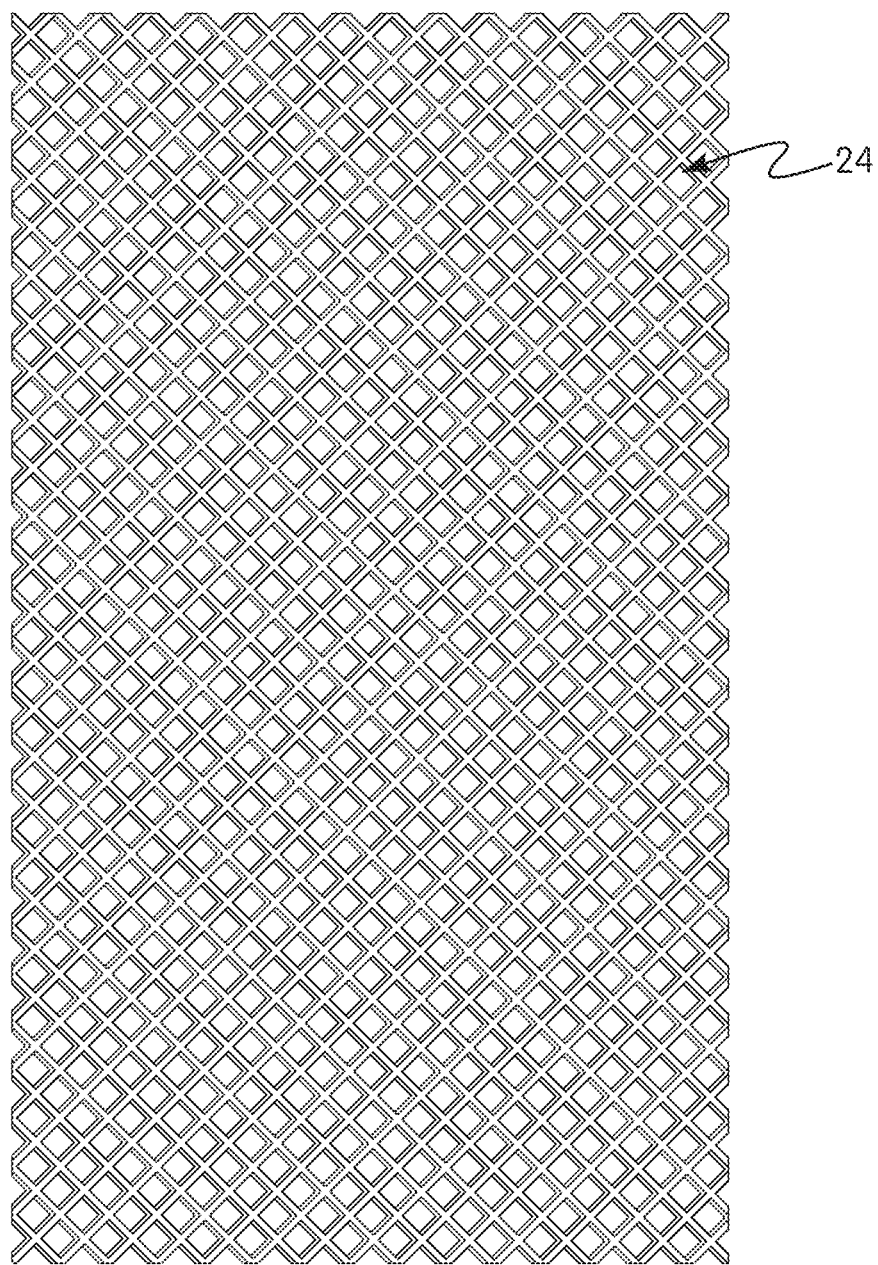
FIG. 6 shows a feed spacer.

As in the example shown in FIG. 4, in the example in FIG. 6 the thickness of the feed flow channels 26A, 26B (not shown) upstream may be greater than the thickness of the feed flow channels 26A, 26B downstream, and/or the effective volume of the filter sections 12A, 12B, 14 positioned upstream may be greater than the effective volume of the filter sections 12A, 12B, 14 positioned downstream in order to maintain a constant velocity of flow throughout the entire filtration system 10 to prevent fouling.

Referring to FIG. 6, the feed spacer 24 may be a permeable sheet having a porous matrix. The pores of the feed spacer 24 may be ¼ inch×¼ inch, but the pores of the feed spacer 24 can be any appropriate size or dimension to facilitate flow through the filtration system 10 (not shown). The feed spacer 24 has a thickness that defines the thickness of the feed flow channel 26 (not shown). The feed spacer 24 may be made of any suitable material, such as a polymeric material. In one example, the feed spacer 24 is made of polypropylene (PP), polyethylene (PE), or a blend of the two.

Figure 7A:
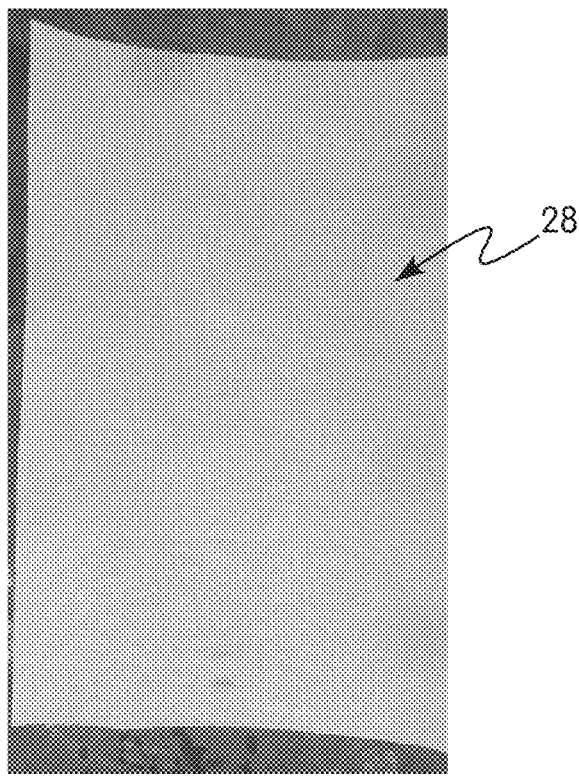
FIG. 7A shows a permeate spacer.
Figure 7B:
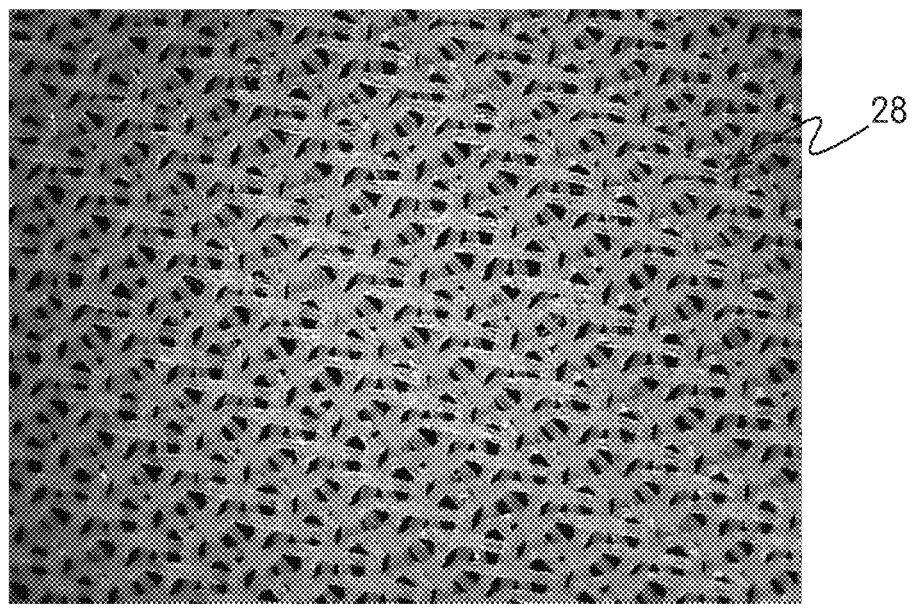
FIG. 7B shows an magnified view of the permeate spacer of FIG. 7A.

Referring to FIGS. 7A and 7B, the permeate spacer 28 may be a permeable sheet having a matrix with pores. FIG. 7B shows a magnified view of the porous matrix of the permeate spacer 28 in FIG. 7A. The permeate spacer 28 may be less permeable than the feed spacer 24 (not shown). The permeate spacer 28 may be made of any suitable material, such as a polymeric material. The permeate spacer 28 may be made from polyester with a treatment of epoxy to make the permeate spacer 28 a stiff sheet.

Figure 8A:
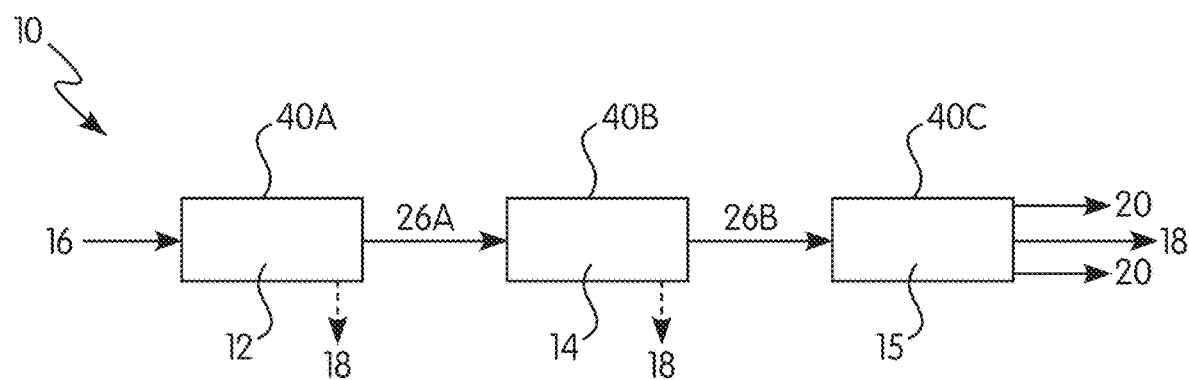
FIG. 8A shows a schematic diagram of a filtration system having filter sections arranged in series, each filter section in its own filter cartridge.
Figure 8B:
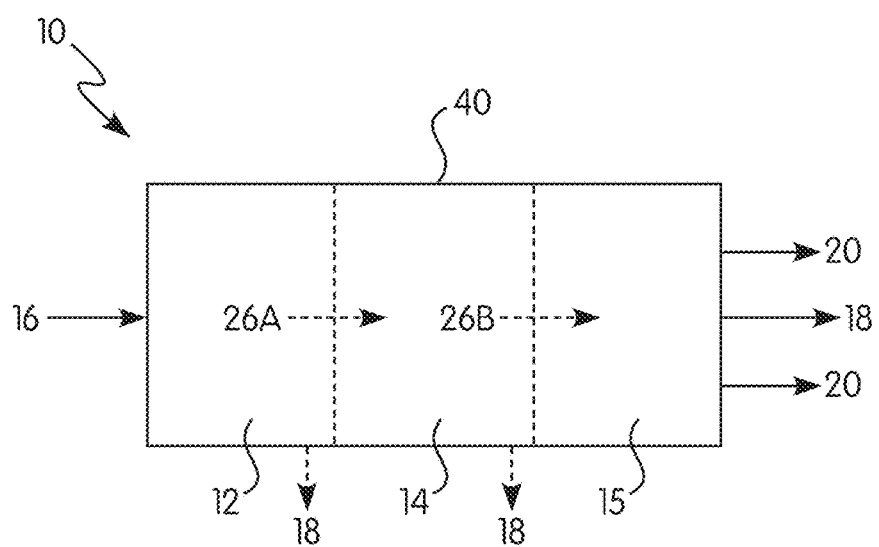
FIG. 8B shows a schematic diagram of a filtration system having filter sections arranged in series, all of the filter sections in a single filter cartridge.

Referring to FIGS. 8A and 8B, two examples of filtration systems 10 having a plurality of filter sections 12, 14, 15 arranged in series are shown. Each example includes a first filter section 12 in fluid communication with a second filter section 14 in fluid communication with an $n^{th}$ filter section 15. In FIG. 8A, each filter section 12, 14, 15 is disposed within its own filter cartridge 40A, 40B, 40C. The first filter section 12 is disposed within the first filter cartridge 40A, the second filter section 14 is disposed within the second filter cartridge 40B, and the $n^{th}$ filter section 15 is disposed within the $n^{th}$ filter cartridge 40C. In contrast, in FIG. 8B, all of the filter sections 12, 14, 15 are disposed within the single filter cartridge 40.

With continued reference to FIGS. 8A and 8B, as in the example shown in FIGS. 4 and 5, the thickness of the feed flow channels 26A, 26B upstream may be greater than the thickness of the feed flow channels 26A, 26B downstream, and/or the effective volume of the filter sections 12, 14, 15 positioned upstream is greater than the effective volume of the filter sections 12, 14, 15 positioned downstream in order to maintain a constant velocity of flow throughout the entire filtration system 10 to prevent fouling.

With continued reference to FIGS. 8A and 8B the filtration system 10 may include at least one filter cartridge/housing 40, 40A, 40B, 40C, each filter cartridge 40, 40A, 40B, 40C including at least one filter section 12, 14, 15. A filter cartridge 40 may include multiple filter sections 12, 14, 15 (see FIG. 8B). The filter cartridges 40, 40A, 40B, 40C may be industry standard sizes, typically from 18-40 inches in length. The plurality of filter sections 12, 14, 15 may each be housed in its own filter cartridge 40A, 40B, 40C (see FIG. 8A). There may also be a combination of FIGS. 8A and 8B where the filtration system 10 includes a filter cartridge 40, 40A, 40B, 40C having multiple filter sections 12, 14, 15 therein and a filter cartridge 40, 40A, 40B, 40C having a single filter section 12, 14, 15 therein. In FIG. 8A, there are three filter cartridges 40A, 40B, 40C in series, each with its own filter section 12, 14, 15. In contrast, FIG. 8B includes three filter sections 12, 14, 15 contained in the same filter cartridge 40.

Figure 9:
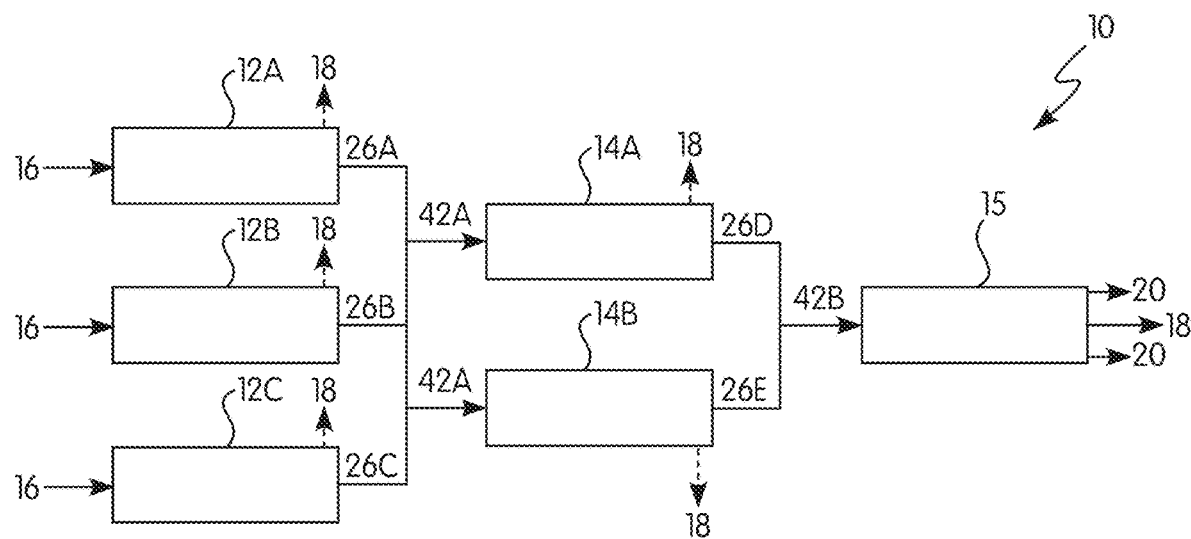
FIG. 9 shows a schematic diagram of a filtration system having multiple filter sections arranged in parallel.

Referring to FIG. 9, in an alternate configuration, the filtration system 10 may include a plurality of filter sections 12A, 12B, 12C, 14A, 14B, 15 arranged in parallel and/or in series with the other filter sections 12A, 12B, 12C, 14A, 14B, 15. The number of first filter sections 12A, 12B, 12C may be greater than the number of second filter sections 14A, 14B, which is greater than the number of $n^{th}$ filter sections 15. The example shown in FIG. 9 includes a plurality of the first filter sections 12A, 12B, 12C in parallel with one another, which are in series with a plurality of the second filter sections 14A, 14B in parallel with one another, which are in series with the $n^{th}$ filter section 15. The feed solution 16 flows into the first filter sections 12A, 12B, 12C and the flow not filtered out of each first filter section 12A, 12B, 12C flows out of the first filter sections 12A, 12B, 12C via the respective feed flow channels 26A, 26B, 26C and into the first common discharge header 42A. The flow in the first common discharge header 42A flows into the second filter sections 14A, 14B. The flow not filtered out of each second filter section 14A, 14B flows out of the second filter sections 14A, 14B via the respective feed flow channels 26D, 26E and into the second common discharge header 42B. The flow in the second common discharge header 42B flows into the $n^{th}$ filter section 15, and the output of the $n^{th}$ filter section 15 is the permeate product 18 and the concentrate product 20. The permeate product 18 may also be pulled off of the first and/or second filter sections 12A, 12B, 12C, 14A, 14B. The example shown in FIG. 9 is arranged in a 3-2-1 configuration, but other configurations are contemplated, such as a 5-4-3 configuration or a 5-2-1 configuration, as just two additional examples.

With continued reference to FIG. 9, as in the example shown in FIGS. 4 and 5, the thickness of the feed flow channels 26A, 26B, 26C, 26D, 26E immediately upstream may be greater than the thickness of the feed flow channels 26A, 26B, 26C, 26D, 26E immediately downstream, and/or the sum of the effective volumes of the filter sections 12A, 12B, 12C, 14A, 14B, 15 positioned immediately upstream is greater than the sum of the effective volumes of the filter sections 12A, 12B, 12C, 14A, 14B, 15 positioned immediately downstream in order to maintain a constant velocity of flow throughout the entire filtration system 10 to prevent fouling. For instance, in FIG. 9, the thickness of the feed flow channels 26A, 26B, 26C of the first filter sections 12A, 12B, 12C is greater than the thickness of the feed flow channels 26D, 26E of the second filter sections 14A, 14B, and/or the sum of the effective volumes of the first filter sections 12A, 12B, 12C is greater than the sum of the effective volumes of the second filter sections 14A, 14B, which is greater than the effective volume of the $n^{th}$ filter section 15.

Figure 10:
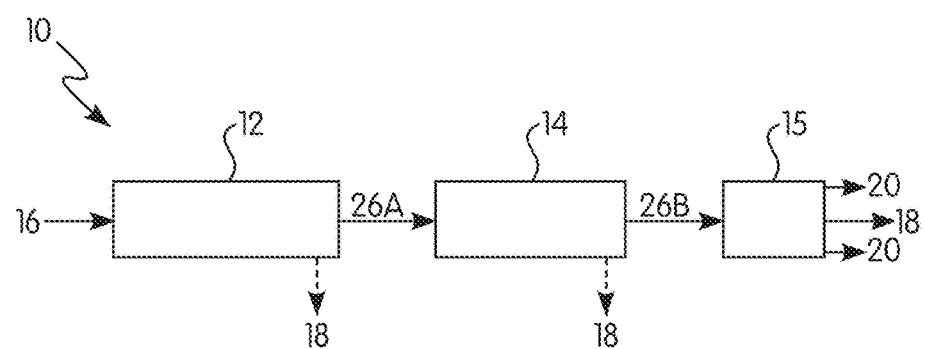
FIG. 10 shows a schematic diagram of a filtration system having multiple filter sections arranged in series, with downstream filter sections being progressively shorter in length.

Referring to FIG. 10, the filtration system 10 may include a plurality of filter sections 12, 14, 15 arranged in series, with each of the filter sections 12, 14, 15 having different lengths. The example illustrated in FIG. 10 includes the first filter section 12, the second filter section 14, and the $n^{th}$ filter section 15. The first filter section 12 is longer than the second filter section 14, and the second filter section 14 is longer than the $n^{th}$ filter section 15. The progressive shortening of the filter sections 12, 14, 15 reduces the effective volume downstream, allowing the filtration system 10 to maintain a constant flow velocity throughout to prevent fouling.

The invention can be further described in the following numbered clauses.

Clause 1: A filtration system, comprising: at least one spiral wound first filter section in fluid communication with at least one spiral wound second filter section, wherein the first and second filter sections comprise: a filtration membrane; a feed spacer located adjacent the filtration membrane and defining a feed flow channel; and a permeate spacer located adjacent the filtration membrane and defining a permeate flow channel, wherein (i) a thickness of the feed flow channel in the first filter section is different than a thickness of the feed flow channel in the second filter section, and/or (ii) an effective volume of the first filter section is different than an effective volume of the second filter section.

Clause 2: The filtration system of clause 1, wherein a velocity of feed through the first filter section and the second filter section is substantially constant.

Clause 3: The filtration system of clause 1 or 2, wherein the first and second filter sections are located in a single filter cartridge.

Clause 4: The filtration system of any of clauses 1 to 3, wherein the first and second filter sections are arranged in series.

Clause 5: The filtration system of any of clauses 1 to 4, wherein the first filter section is located upstream of the second filter section, and wherein the thickness of the feed flow channel in the second filter section is smaller than the thickness of the feed flow channel in the first filter section.

Clause 6: The filtration system of any of clauses 1 to 5, wherein the first filter section is located upstream of the second filter section, and wherein the effective volume of the second filter section is smaller than the effective volume of the first filter section.

Clause 7: The filtration system of any of clauses 1 to 6, comprising: a plurality of first filter sections arranged in parallel, wherein the feed flow channels of the first filter sections discharge into a common discharge header; and at least one second filter section in fluid communication with the common discharge header, wherein the number of first filter sections is greater than the number of second filter sections.

Clause 8: The filtration system of clause 7, wherein an effective volume of the at least one second filter section is smaller than a sum of the effective volumes of the plurality of first filter sections.

Clause 9: The filtration system of any of clauses 1 to 8, wherein the first filter section and/or the second filter section comprise a plurality of laminar units, wherein each laminar unit comprises a feed spacer, a first filtration membrane adjacent the feed spacer, a permeate spacer adjacent the first filtration membrane, and a second filtration membrane adjacent the permeate spacer.

Clause 10: The filtration system of any of clauses 1 to 9, wherein a velocity of feed through the second filter section is 95-125% of a velocity of feed through the first filter section.

Clause 11: The filtration system of any of clauses 1 to 10, wherein the first filter section and the second filter section each comprise at least one laminar unit, wherein the number of laminar units of the first filter section is different than the number of laminar units of the second filter section.

Clause 12: A method of filtering a feed flow, comprising: introducing a feed flow into at least one spiral wound first filter section comprising a filtration membrane, a feed spacer located adjacent the filtration membrane and defining a feed flow channel, and a permeate spacer located adjacent the filtration membrane and defining a permeate flow channel; removing permeate via the permeate flow channel of the first filter section to form a concentrated feed flow; discharging the concentrated feed flow from the first filter section to a spiral wound second filter section, the second filter section comprising a filtration membrane, a feed spacer located adjacent the filtration membrane and defining a feed flow channel, and a permeate spacer located adjacent the filtration membrane and defining a permeate flow channel, wherein a thickness of the feed flow channel in the first filter section is different than a thickness of the feed flow channel in the second filter section such that a velocity of feed flow through the filtration system is substantially constant.

Clause 13: The method of clause 12, wherein the first and second filter sections are located in a single filter cartridge.

Clause 14: The method of clause 12 or 13, wherein the first and second filter sections are arranged in series.

Clause 15: The method of any of clauses 12 to 14, wherein the first filter section is located upstream of the second filter section, and wherein the thickness of the feed flow channel in the second filter section is smaller than the thickness of the feed flow channel in the first filter section.

Clause 16: The method of any of clauses 12 to 15, wherein the first filter section is located upstream of the second filter section, and wherein the effective volume of the second filter section is smaller than the effective volume of the first filter section.

Clause 17: The method of any of clauses 12 to 16, comprising: a plurality of first filter sections arranged in parallel, wherein the feed flow channels of the first filter sections discharge into a common discharge header; and at least one second filter section in fluid communication with the common discharge header, wherein the number of first filter sections is greater than the number of second filter sections.

Clause 18: The method of clause 17, wherein an effective volume of the at least one second filter section is smaller than a sum of the effective volumes of the plurality of first filter sections.

Clause 19: The method of any of clauses 12 to 18, wherein the first filter section and/or the second filter section comprise a plurality of laminar units, wherein each laminar unit comprises a feed spacer, a first filtration membrane adjacent the feed spacer, a permeate spacer adjacent the first filtration membrane, and a second filtration membrane adjacent the permeate spacer.

Clause 20: The method of any of clauses 12 to 19, wherein the feed comprises a hydrocarbon.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more feature of any other embodiment.

The invention claimed is:

1. A filtration system, comprising:
at least one spiral wound first filter section in fluid communication with at least one spiral wound second filter section, wherein the first and second filter sections comprise:
a filtration membrane;
a feed spacer located adjacent the filtration membrane and defining a feed flow channel; and
a permeate spacer located adjacent the filtration membrane and defining a permeate flow channel,
wherein (i) a thickness of the feed flow channel in the first filter section is different than a thickness of the feed flow channel in the second filter section, and/or (ii) an effective volume of the first filter section is different than an effective volume of the second filter section,
wherein the thickness of the feed spacer defines the thickness of the feed flow channel, and
wherein a velocity of feed through the first filter section and the second filter section is substantially constant.

2. The filtration system of claim 1, wherein the first and second filter sections are located in a single filter cartridge.

3. The filtration system of claim 1, wherein the first and second filter sections are arranged in series.

4. The filtration system of claim 1, wherein the first filter section is located upstream of the second filter section, and wherein the thickness of the feed flow channel in the second filter section is smaller than the thickness of the feed flow channel in the first filter section.

5. The filtration system of claim 1, wherein the first filter section is located upstream of the second filter section, and wherein the effective volume of the second filter section is smaller than the effective volume of the first filter section.

6. The filtration system of claim 1, comprising:
a plurality of first filter sections arranged in parallel, wherein the feed flow channels of the first filter sections discharge into a common discharge header; and
at least one second filter section in fluid communication with the common discharge header, wherein the number of first filter sections is greater than the number of second filter sections.

7. The filtration system of claim 6, wherein an effective volume of the at least one second filter section is smaller than a sum of the effective volumes of the plurality of first filter sections.

8. The filtration system of claim 1, wherein the first filter section and/or the second filter section comprise a plurality of laminar units, wherein each laminar unit comprises a feed spacer, a first filtration membrane adjacent the feed spacer, a permeate spacer adjacent the first filtration membrane, and a second filtration membrane adjacent the permeate spacer.

9. The filtration system of claim 1, wherein a velocity of feed through the second filter section is 95-125% of a velocity of feed through the first filter section.

10. The filtration system of claim 1, wherein the first filter section and the second filter section each comprise at least one laminar unit, wherein the number of laminar units of the first filter section is different than the number of laminar units of the second filter section.

11. The filtration system of claim 1, wherein the thickness of the feed flow channel is 10-200 mils.

12. A method of filtering a feed flow, comprising:
introducing a feed flow into at least one spiral wound first filter section comprising a filtration membrane, a feed spacer located adjacent the filtration membrane and defining a feed flow channel, and a permeate spacer located adjacent the filtration membrane and defining a permeate flow channel;
removing permeate via the permeate flow channel of the first filter section to form a concentrated feed flow;
discharging the concentrated feed flow from the first filter section to a spiral wound second filter section, the second filter section comprising a filtration membrane, a feed spacer located adjacent the filtration membrane and defining a feed flow channel, and a permeate spacer located adjacent the filtration membrane and defining a permeate flow channel,
wherein a thickness of the feed flow channel in the first filter section is different than a thickness of the feed flow channel in the second filter section such that a velocity of feed flow through the filtration system is substantially constant, and
wherein the thickness of the feed spacer defines the thickness of the feed flow channel.

13. The method of claim 12, wherein the first and second filter sections are located in a single filter cartridge.

14. The method of claim 12, wherein the first and second filter sections are arranged in series.

15. The method of claim 12, wherein the first filter section is located upstream of the second filter section, and wherein the thickness of the feed flow channel in the second filter section is smaller than the thickness of the feed flow channel in the first filter section.

16. The method of claim 12, wherein the first filter section is located upstream of the second filter section, and wherein the effective volume of the second filter section is smaller than the effective volume of the first filter section.

17. The method of claim 12, comprising:
a plurality of first filter sections arranged in parallel, wherein the feed flow channels of the first filter sections discharge into a common discharge header; and
at least one second filter section in fluid communication with the common discharge header, wherein the number of first filter sections is greater than the number of second filter sections.

18. The method of claim 17, wherein an effective volume of the at least one second filter section is smaller than a sum of the effective volumes of the plurality of first filter sections.

19. The method of claim 12, wherein the first filter section and/or the second filter section comprise a plurality of laminar units, wherein each laminar unit comprises a feed spacer, a first filtration membrane adjacent the feed spacer, a permeate spacer adjacent the first filtration membrane, and a second filtration membrane adjacent the permeate spacer.

20. The method of claim 12, wherein the feed comprises a hydrocarbon.

* * * * *